May 24, 1927.
J. HOHL ET AL
1,629,917
MATERIAL DIVIDING MACHINE
Filed Jan. 18, 1923
2 Sheets-Sheet 2
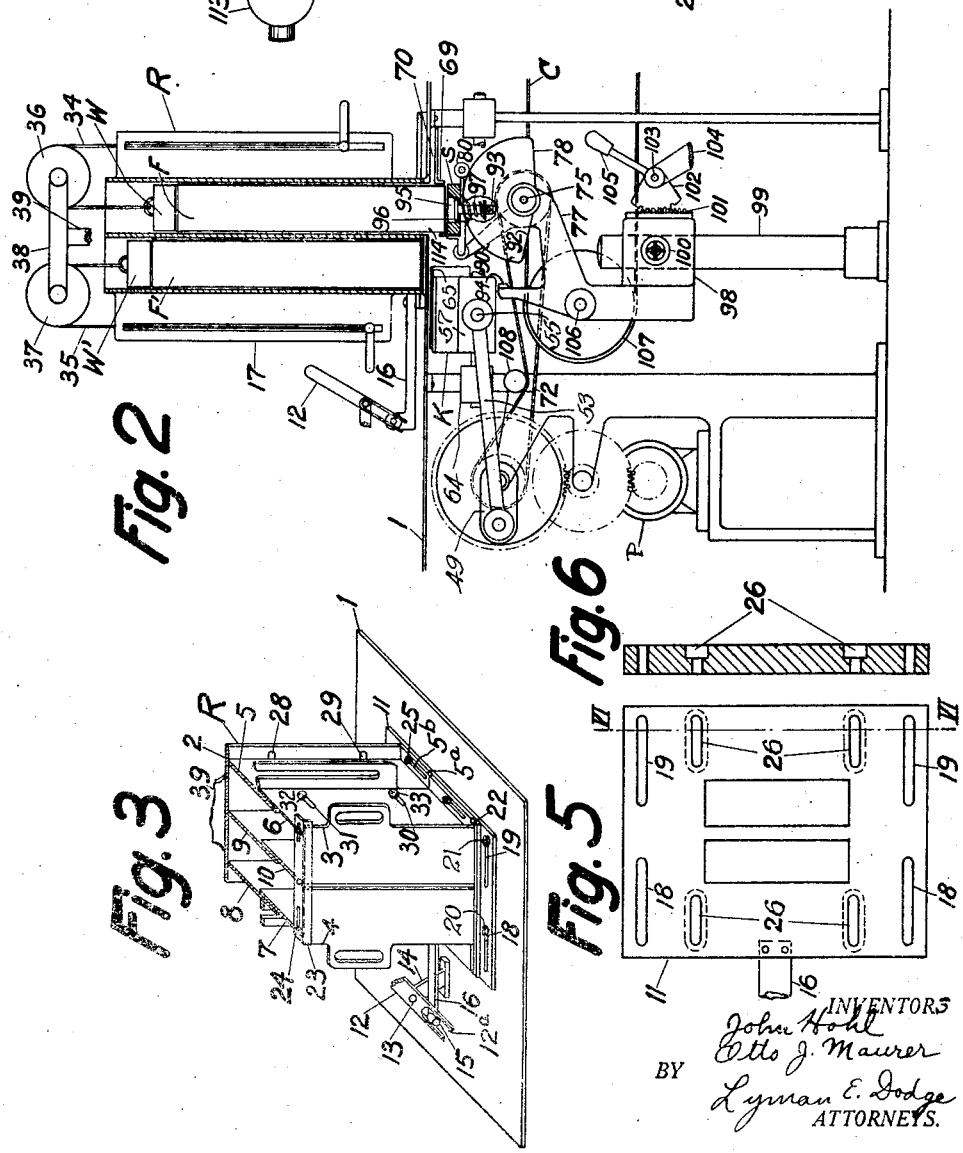

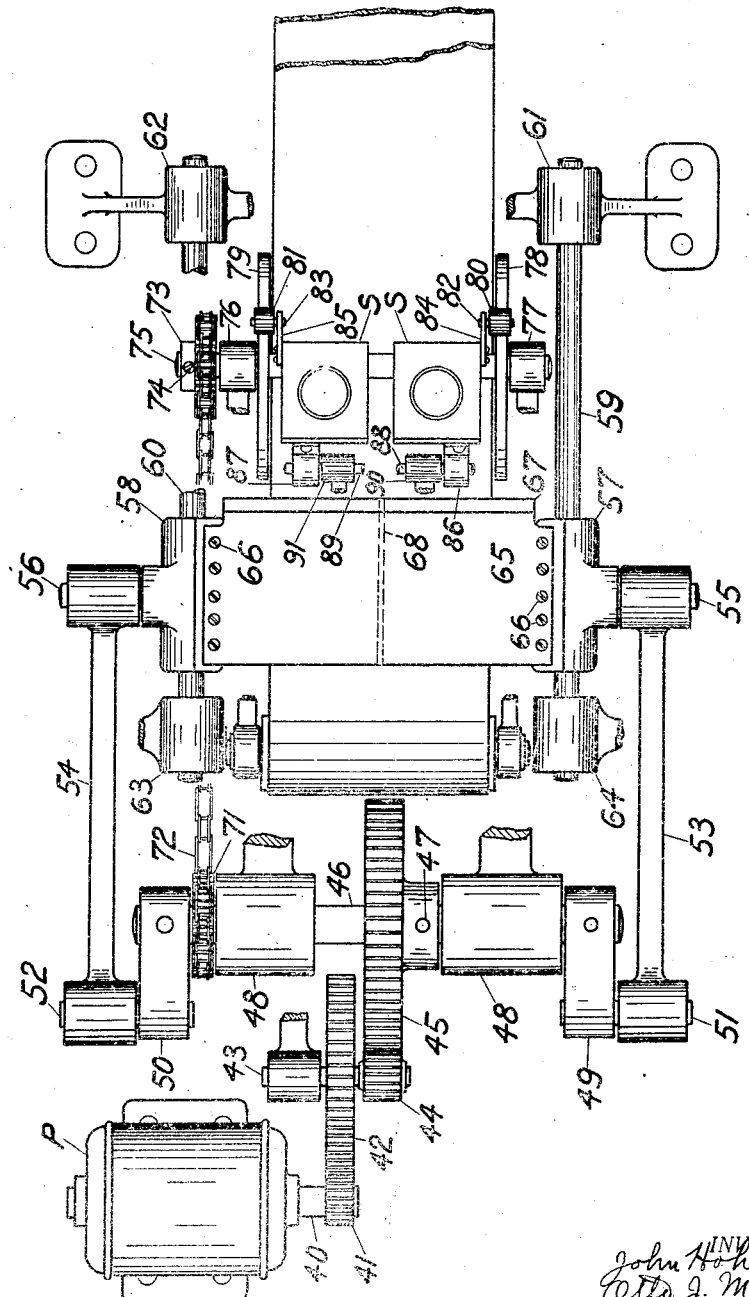

Patented May 24, 1927.

1,629,917

UNITED STATES PATENT OFFICE.

JOHN HOHL, OF LINCOLN PARK, NEW JERSEY, AND OTTO J. MAURER, OF WILKINS-BURG, PENNSYLVANIA.

MATERIAL-DIVIDING MACHINE.

Application filed January 18, 1923. Serial No. 613,364.

This invention relates to slicing machines and particularly to machines for slicing solid bars of food and like material, especially ice-cream.

At the present time enormous quantities of ice cream are made and sold. A large portion is manufactured in establishments entirely devoted to such work. In these establishments it is often, in fact generally, formed in the process of manufacture into the shape of a rectangular prism of large dimensions as compared with the quantity usually served as a portion in retail establishments. The prism is best delivered to the retail establishments in the form of small slices or cakes each containing the quantity usually served as a portion. This necessitates dividing the prism into a plurality of pieces, by longitudinal and transverse cuts.

It is an object of applicants' invention to produce a machine for dividing ice cream bars and similar prisms of food or like material in a rapid and expeditious manner.

It is a further object of applicants' invention to produce a machine for the purpose stated which will be simple in construction, economical to build and to operate and which will operate extremely rapidly.

Other objects and advantages of the invention will appear as the description of the particular physical embodiment selected to illustrate the invention progresses, and the novel features will be particularly pointed out in the appended claims.

In describing the invention in detail and the particular physical embodiment selected to illustrate the invention reference will be had to the accompanying drawings, wherein has been illustrated a particular preferred physical embodiment of the invention, and in which:

Fig. 1 is a top plan view of a device embodying the invention with certain parts removed to more clearly show the construction; Fig. 2 is a side elevational view of the device as shown by Fig. 1, with certain parts shown in cross section; Fig. 3 is a perspective view of what will be hereinafter termed the bar receptacle, certain parts being shown in section; Fig. 4 is a detailed view illustrating one means for maintaining tension on a sprocket chain; Fig. 5 is a top plan view of plate 11; Fig. 6 is a cross-sectional view on the plane indicated by the line VI—VI of Fig. 5; Fig. 7 is a fragmentary rear view of a bar receptacle.

The devices illustrated in the drawings include generally a power supplying means P; a bar receptacle R; a slicing and dividing knife K; a bar stop and slice receiving platform S; and a conveying means C.

The material which is to be sliced and divided by the mechanisms shown in the drawings is first received by the receptacle. This receptacle is shown in perspective in Fig. 3. It rests upon the platform 1, of the machine and comprises an end 2, divided ends 3 and 4, adjustable sides 5, 6, 7 and 8, a fixed dividing partition 9 and a slidable adjustable partition 10. The several ends and partitions above mentioned rest upon a base plate 11, which base plate is movable as a whole together with the sides, ends and partitions upon the plate 1. This movement being obtained by means of shifting lever 12, pivoted at 13 to a bracket 14 attached to the top plate 1 of the machine. The shifting lever 12 has a lower bifurcated end 12$^a$ and within the bifurcation is positioned a pin 15 fixedly attached to plate 16 which connects fixedly with the plate 11, best shown in Fig. 5. The plate 11 has four slots, two at each end of which only two, 18 and 19 appear in Fig. 3. These slots have passing therethrough the bolts as 20 and 21, having heads thereon and which are threaded into a threaded orifice in the plate 1, so that the plate 11 is prevented from moving upwardly away from the table top 1 but is allowed to be moved freely back and forth.

In order to place the material to be sliced and divided into the receptacle R, the ends 3 and 4 are removed by sliding them in opposite directions away from the partition 10. The bar of food is then inserted between the partitions as 9 and 10 and sides 5 and 6 or 7 and 8. If the bar of food just fits the space between the central partitions 9 and 10 and the sides as 5 and 6 or 7 and 8 then the ends 3 and 4 may be slid back into place, being guided by the rib 22 at the bottom and the rib 23 on the holdfast 24 at the top. If the bar of food to be sliced and divided which is inserted between the central partitions as 9 and 10 and the sides as 5 and 6 or 7 and 8 does not exactly fit the space then it is necessary to adjust the receptacle so that the food bar will be closely held. In order to do this the sides 5, 6, 7 and 8 are made adjustable. The side 5 which is exactly like the side 8 except that it is reversely formed has a right angled portion 5ª at its lower end, and this right angled portion has a slot 5ᵇ formed therein, in which slot is positioned a bolt the head of which is positioned in an L shaped channel 26 formed in the underside of plate 11 and which bears at its upper end a suitable nut. This construction allows the side 5 and the side 8 together with the back end 2 to be moved to and from the ends 3 and 4 and to be fixed in adjusted position by the nut on the end of the bolt 25. The partition 9 is attached rigidly to the back end 2 so that it always moves therewith and always maintains the same relation thereto, but the sides as 5 and 8 are movable toward and from each other being held in adjusted position by a cap screw 27 passing through a slot as 28 and 29 in the end 2 so that if the bar of food which is placed in the receptacle is too narrow to fill the receptacle the sides as 5 and 8 may be moved so as to just touch the bar and then be fastened in position by the cap screws as 27 and the bolts as 25. The movement of sides 5 and 8 with respect to sides 6 and 7 in a direction at right angles to the ends 3 and 4 is provided for by the slots 30 and 31 and the cap screws 32 and 33 threaded into the sides 5 and 8 as shown in relation to the sides 5 and 6.

From the above description of the food or like material receptacle R it will be readily understood that prisms or bars of food or like material of greatly varying cross-sectional area may be positioned in the spaces of receptacle R between the central partitions 9 and 10 and the sides as 5 and 6 or 7 and 8, or both, so that two prisms or bars of food may be present in the receptacle R at one time. This is illustrated by Fig. 2 in which F designates one of the bars and F¹ the other. When these bars of food have been put in place the weights as W and W' are allowed to rest thereon, acting to force the bar of food from the lower orifice through the table top onto the receiving platform S. These weights W and W' are attached to cords as 34 and 35 passing over guiding pulleys 36 and 37, journaled in a cross piece 38, supported by standard 39, attached to the back end 2 of the receptacle R.

Referring particularly to Fig. 1 the motor P has its shaft 40 rigidly attached to a pinion 41, meshing with gear wheel 42, journaled on pin 43, which pin at its outer end bears the pinion 44, meshing with gear wheel 45. The gear wheel 45 is fixedly attached to the shaft 46, as by pin 47, so that the rotation of gear wheel 45 causes a rotation of shaft 46. This shaft 46 is journaled in bearings 48, and at either end extends beyond the bearings and bears crank arms 49 and 50. Each crank arm has pins 51 and 52 fastened in its outer end and embracing these pins are the links 53 and 54, which links at the right hand end as viewed in Fig. 1 embrace pins 55 and 56 fastened in cross-heads 57 and 58. The cross-heads 57 and 58 embrace and slide upon the ways 59 and 60, these ways being supported fixedly by brackets 61, 62, 63 and 64.

In order to slice the bar of food material resting upon the receiving platforms S applicant has provided a knife member having two cutting edges, one at right angles to the other. The knife member designated 65, is attached by any suitable means as by screws 66 to the cross-heads 57 and 58 and is formed with a knife edge 67, positioned horizontally and a knife edge 68 intermediate the ends of the member 65 and below the same and positioned in a vertical plane, that is at a right angle to the edge 67.

If a bar of food material as F is resting upon the receiving platform S and the motor P is caused to rotate then the knife member 65 will reciprocate to the right and to the left as viewed in Fig. 1; and in reciprocating to the right as viewed in Fig. 1 will contact with and penetrate the lower end of the food bar F, severing therefrom a slice of a determined thickness, and will also divide that slice into two parts on a vertical plane, and the two parts will rest, one upon each of the receiving platforms S. It is also to be observed that while the knife member 65 is forcing its way through the food bar F, that the food bar will be supported against movement transversely to its length by the stop 69, best shown in Fig. 2, and it is also to be observed that a space 70 exists between the top of the stop 69 and the bottom of the table top 1, which allowed the horizontal slicing member 67 to pass therebetween.

Shaft 46, not only causes an oscillatory movement of the knife member 65, but causes a rotatory movement of sprocket wheel 71, which engaging with the sprocket 72 causes this sprocket to rotate sprocket wheel 73, fixedly attached, as by screw 74, to shaft 75, journaled in bearings 76 and 77.

Shaft 75 has fixed intermediate its ends two cams 78 and 79, identical in construction and contour. These cams are shown in top elevation in Fig. 1, and one of them, 78, is shown in side elevation in Fig. 2. As shaft 75 rotates it causes cams 78 and 79 to rotate.

Resting upon each of the cams 78 and 79, are bearing rollers 80 and 81, journaled on pins 82 and 83 fixed in projecting arms 84 and 85 attached in any desired manner to the receiving platforms S.

The receiving platforms S are identical in construction and each has attached thereto integrally or otherwise, a backwardly extending pin embracing arm as 86 and 87.

These pin embracing arms embrace pins as 88 and 89, which are fixedly supported by the brackets 90 and 91.

With the cam as 78 in the position as shown by Fig. 2, the bearing rollers 80 rest upon the contour of the cam and support the receiving platform S in the position as shown by Fig. 2. The cams are so formed and so mounted upon shaft 75 that as soon as the knife member K has severed the slice from the food bar the cams immediately are turned into that position wherein it presents the edge 92 to the bearing roller as 80 and 81, which following the contour of the cam and dropping by gravity allows the receiving platforms S to swing about the pins as 88 and 89 until the piston rod 93 contacts with fixed stop 94, whereupon the slice of material resting on the receiving platforms as S falls on to the belt of the conveyor C. In order to be certain that the slice of material is properly severed from the platforms as S applicants have provided an orifice or cavity as 95 in the platforms as S, and within this cavity is positioned a piston 96, rigidly attached to the piston rod 93 and spring held downwardly by the spring, as 97, so that when the piston rod 93 contacts with the stop 94 the rod and piston are pushed in such a way that the piston 96 contacts with and pushes the slice of material from the receiving platform as S.

While the cutting member K is at its extreme right hand position, as shown in Fig. 2, and while receiving platforms, as S, are discharging their load and the material bar F is sustained in its then position by the cutting member K, and is so supported until upon further movement of the cams as 78 and 79 the receiving platforms as S are brought back to their initial position ready to receive the food bar F, when the cutting member K has retreated so far to the left as viewed in Fig. 2 as to allow the material bar F aided by the weight W to fall through the slot in the table upon the receiving platforms as S, whereupon the continued movement of motor P causes a repetition of the actions hereinbefore described.

In practice it is necessary to vary the thickness of the slice of material formed by the cutting member K. In applicants' construction this result is readily and quickly obtained, even while the machine is in operation, if necessary, because the shaft 75 is supported by a bracket 77 which is formed or made integral with the brackets as 90, and forms part of a standard clasping member 98 which clasps the standard 99 and slides freely thereupon vertically but when in adjusted position is held fixedly thereto by a hold-fast hand wheel screw 100. In order to make the adjustment readily member 98 has formed integrally or attached thereto the rack bar 101, with which the sector 102 engages. This sector being oscillatably mounted upon pin 103 supported by bracket 104, and the sector having the adjusting handle 105 attached thereto so that by an up or down motion of 105 after 100 is loosened the platforms S may be moved down or up and then held in adjusted position by tightening 100.

Applicants have also fixed the pin 106 upon which conveyor belt wheel 107 rotates to the member 98, so that, the conveyor belt C is raised and lowered, synchronously with the receiving platforms as S.

As shaft 75 may be raised or lowered it is necessary to provide means for taking up the slack in sprocket chain 72. This is done by the member designated generally in Fig. 2 by 108, and shown in detail in Fig. 4, wherein 72 designates the sprocket chain, 109 a fixed bracket and 110 an arm pivoted as by pin 111 to a fixed bracket which arm supports a rotatable sprocket wheel 108, and also the adjustable weight 113, thereby providing a structure which allows the distance between the centers of shafts 75 and 46 to be varied, but at the same time automatically provides that the sprocket chain 72 will always be sufficiently tight to properly transmit power.

After one material bar F has been sliced and divided as hereinbefore described, then the lever 12 is shifted bringing the bar F over the slot 114 in the table top 1, thereby allowing it to fall through the slot 114 onto the receiving platforms S be sliced and divided as hereinbefore described, and while being so operated upon another bar F may be inserted in the vacant chamber and then, when bar F has been entirely sliced and divided, by shifting the lever 12 back to its initial position as shown in Fig. 2 the bar F will be operated upon, so that it will be readily seen, that after the machine has once been started it is unnecessary to stop it to continue operating upon the bars, as one compartment of the receptacle R may be filled while the bar in the other compartment is being operated upon, and the slices formed are automatically removed from the machine by being dropped upon the conveyor belt C.

Although we have herein described and illustrated one particular preferred physical embodiment of our invention and explained the principle and construction thereof, nevertheless we desire to have it understood that the form selected is merely illustrative, and does not exhaust the possible physical embodiments of the idea of means underlying our invention.

What we claim as new and desire to secure by Letters Patent of the United States is:

1. In a material slicing machine, the combination; a material receiving platform pivotally mounted at one end; a bearing roller attached to the other end; a cam supporting the bearing roller, said cam being formed with a circular contour for a portion of its periphery and for a portion of its periphery being so formed that the bearing roller receives no support, so that the platform swings on its pivot downwardly, thereby enabling material resting on the platform to fall off.

2. In a material slicing machine, in combination; a platform pivoted at one end; means to at times support the other end and at times allow it to freely fall; said platform being formed with a cavity, and a piston fitting the cavity and resting therein at the bottom thereof; a rod attached to the piston and extending through the lower face of the platform fixed rigidly to the piston and spring pressed away from the bottom face of the platform, and a fixed abutment positioned to contact with the piston rod and force the piston outwardly when the platform swings downwardly.

3. In a material slicing machine, in combination; a material receptacle including end walls, side walls, and an intermediate partition and means connecting the end wall, side wall and intermediate partition whereby the spaces therebetween may be increased or decreased within fixed limits; means serving to support material in the receptacle, formed with an orifice and means for moving the receptacle whereby the material is positioned over the orifice.

4. In a material slicing machine, in combination; a platform pivoted at one end, a bearing roller attached to the other end; a cam pivoted for rotation supporting the bearing roller and formed with a supporting peripheral portion; a freeing peripheral portion whereby the platform is freed and may swing upon its pivot, and a raising peripheral portion whereby the platform after being allowed to swing on its pivot downwardly is raised and then supported by the supporting portion of the periphery; a material receptacle positioned above the platform and having an orifice formed in its bottom, whereby the material therein rests upon the platform; means for rotating the cam and means for supporting the material in the receptacle while the platform is not being supported by the supporting peripheral portion of the cam.

JOHN HOHL.
OTTO J. MAURER.